3,205,239
SODIUM DECABORANE-TETRAHYDROFURAN ADDUCT AND METHOD FOR PREPARING SAME

Edward H. Keefer, Buffalo, N.Y., assignor to Olin Mathieson Chemical Corporation, a corporation of Virginia
No Drawing. Filed Jan. 13, 1959, Ser. No. 786,655
2 Claims. (Cl. 260—346.1)

This invention relates to the preparation of the new adduct, sodium decaborane-ditetrahydrofuran, $$NaB_{10}H_{13} \cdot 2C_4H_8O$$

More in particular, this invention relates to the preparation of sodium decarborane-ditetrahydrofuran by the reaction of sodium hydride with decaborane while the decaborane is dissolved in tetrahydrofuran. The reaction is generally conducted at a temperature of from −40° C. to +60° C.

The sodium decaborane-ditetrahydrofuran adduct is a white to light yellow solid and has a melting point above 305° C.

The product of this invention can be incorporated with suitable oxidizers such as ammonium perchlorate, potassium perchlorate, sodium perchlorate, lithium perchlorate, aluminum perchlorate, ammonium nitrate, etc., to yield a solid propellant suitable for rocket power plants and other jet propelled devices. Such propellants burn with high flame speeds, have high heats of combustion and are of the high specific impulse type. The sodium decaborane adduct, when incorporated with oxidizers, is capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

The following example illustrates the invention.

Example I

Decaborane, 10.43 grams (85.2 mmoles), was dissolved in 100 ml. of tetrahydrofuran in a 300 ml., 3-neck flask equipped with a gas inlet, water cooled condenser, and solid addition tube. The system was flushed with nitrogen which was vented through the condenser and a mercury bubble-off. 2.25 grams of 91% pure sodium hydride (85.2 mmoles) was gradually added by means of the solid addition tube while a magnetic stirrer provided rapid mixing. Hydrogen was evolved and when hydrogen evolution ceased, the reaction mixture was filtered through a coarse glass frit.

A grey pasty deposit remained on the frit and the filtrate was a clear brown solution. The grey deposit was washed with tetrahydrofuran and the washings added to the filtrate. After the grey deposit had dried, it burst into flame, indicating that it was unreacted sodium hydride.

The filtrate was placed under a vacuum at room temperature until most of the tetrahydrofuran was removed at which time 10 ml. of n-pentane was added, resulting in a two-phase liquid system, the pentane phase being the uppermost. The two-phase system was placed in a separatory funnel and the lower layer was removed. The lower layer was placed into another separatory funnel and additional 10 ml. of n-pentane was added. A yellow solid precipitated and the solvent was poured off. The precipitate weighed 16.9 grams after it was freed of solvent at reduced pressure at room temperature.

An elemental analysis of the dried solid indicated that it had the formula $NaB_{10}H_{13} \cdot 2C_4H_8O$.

Calculated: C=33.3%; H=10.1%; B=37.5%.
Found: C=33.4%; H=10.5%; B=38.5%.

In this example, n-pentane was added to the reaction mixture to precipitate the adduct since the adduct is soluble in tetrahydrofuran. Instead of n-pentane, other solvents for decaborane in which the adduct is insoluble, such as normal paraffin hydrocarbons having 5 to 8 carbon atoms including n-octane, n-hexane and n-heptane can be employed. Alternatively, all of the tetrahydrofuran can be removed by vacuum evaporation.

The boron-containing solid material produced by practicing the method of this invention can be employed as an ingredient of solid propellant compositions in accordance with general procedures which are well understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing sodium decaborane adduct, generally from 10 to 35 parts by weight of boron-containing material and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable material, the final propellant also contain an artificial resin, generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided sodium decaborane adduct can be mixed with a high solids content solution of a partially condensed urea-formaldehyde or phenol-formaldehyde resin, the proportions being such that the amount of the resin is about 5 to 10 percent by weight, based upon the weight of the oxidizer and sodium decaborane adduct. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Patent No. 2,622,277 to Bonnell et al. and U.S. Patent No. 2,646,596 to Thomas et al.

I claim:
1. A method for the preparation of a solid sodium decaborane-tetrahydrofuran adduct which comprises reacting sodium hydride with decaborane at a temperature of −40° to +60° C. while the decaborane is dissolved in tetrahydrofuran, and recovering the solid adduct from the reaction mixture.
2. A sodium decaborane tetrahydrofuran adduct of the formula $NaB_{10}H_{13} \cdot 2C_4H_8O$.

No references cited.

MAURICE A. BRINDISI, *Primary Examiner.*
LEON D. ROSDOL, CARL D. QUARFORTH,
*Examiners.*